United States Patent
Ueda et al.

(10) Patent No.: US 6,623,011 B1
(45) Date of Patent: Sep. 23, 2003

(54) WIPER FOR MACHINE TOOL

(75) Inventors: Yasuhisa Ueda, Yamatokooriyama (JP);
Yoshinari Sano, Yamatokooriyama (JP);
Tomokazu Yoshida, Yamatokooriyama (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 09/958,386

(22) PCT Filed: Apr. 4, 2000

(86) PCT No.: PCT/JP00/02185

§ 371 (c)(1),
(2), (4) Date: Dec. 21, 2001

(87) PCT Pub. No.: WO00/61332

PCT Pub. Date: Oct. 19, 2000

(30) Foreign Application Priority Data

Oct. 12, 1999 (JP) .......................................... 11-290302
Apr. 7, 1999 (JP) .......................................... 11-100676

(51) Int. Cl.⁷ .................................................. F16J 15/32
(52) U.S. Cl. ........................................ 277/549; 277/550
(58) Field of Search .................................. 277/549, 550, 277/569

(56) References Cited

U.S. PATENT DOCUMENTS

| | | | | |
|---|---|---|---|---|
| 3,901,517 A | * | 8/1975 | Heathcott | 277/556 |
| 3,980,309 A | * | 9/1976 | Dechavanne | 277/550 |
| 4,327,924 A | * | 5/1982 | Wheeler | 277/551 |
| 4,860,917 A | | 8/1989 | Stohr | |
| 5,058,232 A | * | 10/1991 | Stohr | 15/236.01 |
| 5,509,669 A | * | 4/1996 | Wolfe et al. | 277/654 |
| 6,047,970 A | * | 4/2000 | Friend et al. | 277/550 |
| 6,052,859 A | * | 4/2000 | Diels | 15/256.5 |

FOREIGN PATENT DOCUMENTS

| | | | |
|---|---|---|---|
| DE | 34 42 082 A1 | * | 5/1986 |
| DE | 35 45 168 A1 | * | 6/1987 |
| DE | 43 36 692 A1 | * | 5/1995 |
| EP | 0 502 328 A1 | * | 9/1992 |
| JP | 2-74146 | | 3/1990 |
| JP | 5-42443 | | 2/1993 |
| JP | 11-77481 | * | 3/1999 |
| JP | 2000-42863 A | * | 2/2000 |
| JP | 2001-310238 A | * | 11/2001 |
| JP | 2002-46040 | * | 2/2002 |

* cited by examiner

*Primary Examiner*—William Miller
(74) *Attorney, Agent, or Firm*—Snell & Wilmer, LLP

(57) ABSTRACT

A wiper for machine tools includes an attachment portion 3 to be attached to a machine tool, wherein the machine tool is moved relative to a sliding surface 14, and a wiper body 10 made of an elastic material integrated with the attachment portion 3, wherein a lip portion 11 of the wiper body 10 can be slid on the sliding surface 14, and a fabric material 5 is provided on at least a sliding surface side of the lip portion 1 of the wiper body 10. The lip portion 11 has a low level of abrasion resistance, and a low level of abrasion loss is small. No damages are caused due to collision or impact with chips and a sliding surface does not suffer from damages or the like.

4 Claims, 5 Drawing Sheets ations without cutting oil, the wiper of the present invention is
WIPER FOR MACHINE TOOL

TECHNICAL FIELD

The present invention relates to a wiper for machine tools which is operated on sliding surfaces of machine tools and industrial machines to scrape chips, cutting lubricants, and the like which are present on the sliding surfaces, for the purpose of preventing these chips and cutting lubricants from entering the sliding surfaces.

BACKGROUND ART

Conventionally, a wiper used to remove chips and cutting lubricants from a machine tool includes a lip portion having a sliding portion which is typically made of a rubber material. The reason a rubber material is adopted is that the elasticity thereof is utilized to improve the conforming and scraping capabilities of the wiper in all directions.

Recently, a machine system which does not use a cutting lubricant (dry cutting) in order to avoid environmental issues, a high-speed type machine tool, and the like have been developed. Especially for these machines, a sliding portion of a wiper suffers from significant abrasion due to the high coefficient of friction of rubber and therefore, the closeness of the sliding portion of the wiper to the sliding surface cannot long for a long time.

To address the above problem, a wiper including a sliding portion made of thin spring steel has been proposed. However, when such a wiper is transported in a package made of corrugated cardboard, the wiper is often deformed due to its thinness, causing inconvenience of handling. Further, when such a wiper is used, scattered chips strike and bend the spring steel, resulting in a reduction in the closeness of the wiper. Furthermore, since spring steel is a metallic material, sliding surfaces may be damaged, or the spring steel may be corroded.

DISCLOSURE OF THE INVENTION

A wiper for machine tools according to ther present invention includes an attachment portion to be attached to a machine tool, wherein the machine tool is moved relative to a sliding surface, and a wiper body made of an elastic material integrated with the attachment portion. A lip portion of the wiper body can be slid on the sliding surface, and a fabric material is provided on at least a sliding surface side of the lip portion of the wiper body.

In one embodiment, the fabric material is made of at least one material selected from the group consisting of aromatic polyamide, aliphatic polyamide, and polyester.

In one embodiment, the lip portion of the wiper body is covered with the fabric material.

In one embodiment, the fabric material is made of weave fabric or knit fabric, and a thickness of the fabric material is 0.5 mm or more.

In one embodiment, a fineness of a thread included in the fabric material is 100 deniers or more.

In one embodiment, a coefficient of friction of a thread included in the fabric material is in the range of 0.1 to 0.3.

Since a fabric material is provided on at least a sliding side of a lip portion of a wiper, the coefficient of friction of the lip portion with a sliding surface is reduced and abrasion loss is reduced. Therefore, closeness can be maintained for a long time. Further, the low coefficient of friction allows the wiper to be slid at a high rate. Further, since a sliding portion of the lip portion includes a fabric material, a sliding surface does not suffer from scratches which would be otherwise observed when the sliding portion is made of a metallic material. A defective product due to warpage of a wiper caused by collision or impact with chips, or the like, can be avoided.

When a fabric material (fabric layer) to be abraded by fast sliding operations has a small thickness, a wiper body made of an elastic material, such as rubber, underlying the fabric material is exposed. In this case, friction resistance is increased and abrasion is rapidly increased.

To avoid this, the thickness of a fabric material (original fabric) is set to be 0.5 mm or more (particularly 1 mm or more), or the fineness of a thread included in the fabric material is set to be 100 deniers or more (particularly, the fineness of wefts extending in a direction perpendicular to a sliding direction is set to 400 deniers or more). Therefore, the life of the wiper can be lengthened in fast sliding operations.

According to the present invention, at least a lip portion of a wiper body is covered with a fabric material, whereby the friction resistance of the lip portion is small and therefore a fast sliding operation can be performed and the amount of leaked chips is small over long-term use. Further, since a sliding portion of the lip portion includes a fabric material, a sliding surface does not suffer from scratches which would be otherwise observed when the sliding portion is made of a metallic material. A defective product due to warpage of a wiper caused by collision or impact with chips, or the like, can be avoided.

Therefore, the wiper of the present invention can be used for machine tools which are moved at a high speed. Further, since scraping can be satisfactorily performed in an operation without cutting oil, the wiper of the present invention is applicable to particular operations, such as aluminum cutting.

BEST MODE FOR CARRYING OUT THE INVENTION

Hereinafter, the present invention will be described with reference to the accompanying drawings.

Figure 1:
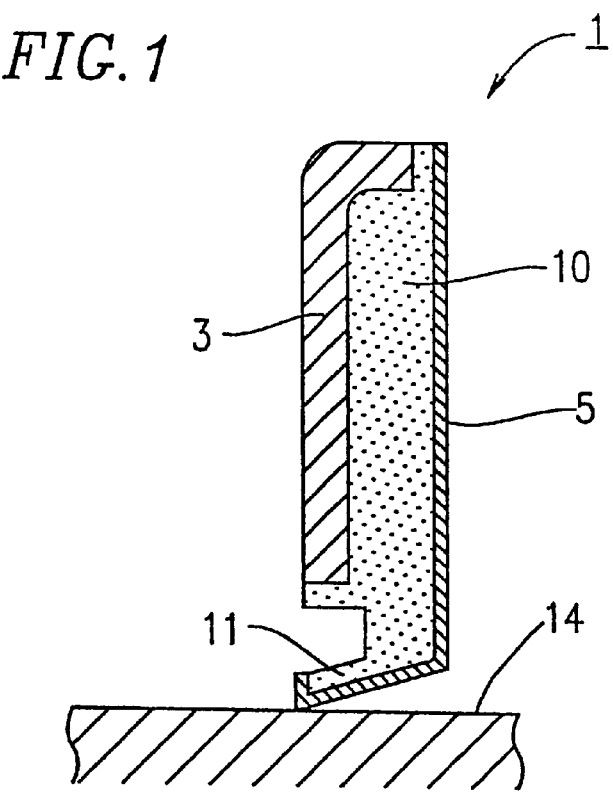
FIG. 1 is a cross-sectional view of a wiper according to an embodiment of the present invention.

Referring to FIG. 1, a wiper 1 for machine tools according to the present invention includes an attachment portion 3 attached to a machine tool which is reciprocated with respect to a sliding surface 14 (e.g., a machine surface or a cover surface), and a wiper body 10 which is made of an elastic material and is integrated with the attachment portion 3.

The attachment portion 3 is also called a cored bar and is typically made of a metallic material.

The wiper body 10 is formed as a long member which transversely extends. A lip portion 11 is provided at a lower portion of the wiper body 10, a thickness of which is gradually decreased toward a tip side thereof. Preferably, the wiper body 10 is made of an elastic material, such as NBR, urethane rubber, fluorocarbon rubber, or H-NBR, is oil-resistant, and has a suitable elasticity in the hardness range of 70 to 90 (typically 70).

For the wiper body 10, at least the lip portion 11 is covered with a fabric material 5.

The fabric material 5 may be made of one or more synthetic fibers (e.g., aliphatic polyamide, aromatic polyamide, and polyester), natural fiber, glass fiber, and metal fiber having a relatively low stiffness, and preferably made of a synthetic fiber, such as aliphatic polyamide, aromatic polyamide, or polyester. The fabric material 5 may be in the form of weave fabric, knit fabric, or the like, and is preferably in the form of weave fabric.

Figure 9:
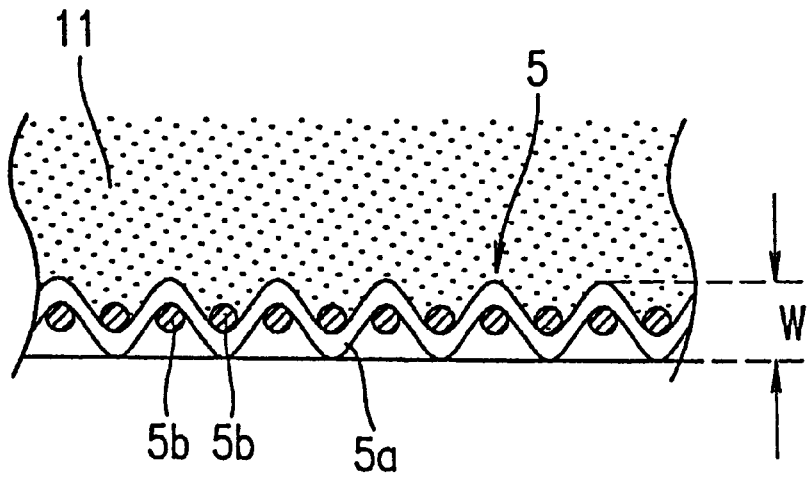
FIG. 9 is a cross-sectional view of a wiper according to still another embodiment of the present invention.

Referring to FIG. 9, when the fabric material 5 is in the form of weave fabric or knit fabric, the thickness of the fabric material is preferably in the range of 0.25 mm to 2.0 mm, more preferably 0.5 mm to 1.5 mm, and even more preferably 0.5 mm to 1.0 mm. The fineness of the fibers of the fabric material is preferably in the range of 50 deniers to 500 deniers, and more preferably 100 deniers to 450 deniers.

Particularly, the fabric material 5 is provided at a sliding surface side of the lip portion 11 in such a manner that wefts 5a of the weave or knit fabric are orthogonal to a sliding direction of the lip portion 11. As such, the fineness of the wefts 5a is preferably in the range of 80 deniers to 500 deniers, and more preferably 100 deniers to 450 deniers. The fineness of the warps 5b may be about half the fineness of the wefts 5a, for example, 40 deniers to 250 deniers, and more preferably 50 deniers to 200 deniers.

When the fineness of the wefts 5a is thus greater than that of the warps 5b, the life of the wiper 1 can be lengthened in high-speed operation. If the stiffness of a waist portion of the lip portion 11 is excessively increased, the stiffness of the wiper itself is increased and therefore the pressing force of the lip portion 11 is increased. This problem can be solved by the fineness of the warps 5b being smaller than that of the wefts 5a. Taking into consideration the linear shape of the edge of the lip portion 11, the area where the fabric material 5 makes contact with the sliding surface is increased, so that the life of the wiper is expected to be lengthened.

The fabric material 5 may be subjected to adhesion treatment or rubber impregnation treatment.

The fabric material 5 may be adhered to a lower surface of the lip portion 11 of the wiper body 10 using an adhesive or by vulcanization.

Figure 2:
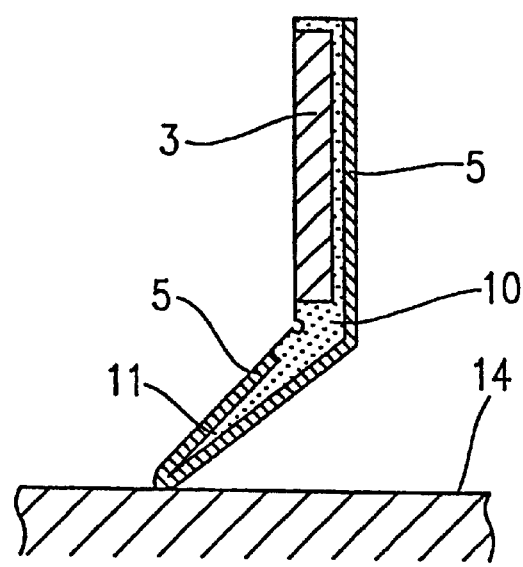
FIG. 2 is a cross-sectional view of a wiper according to another embodiment of the present invention.
Figure 3:
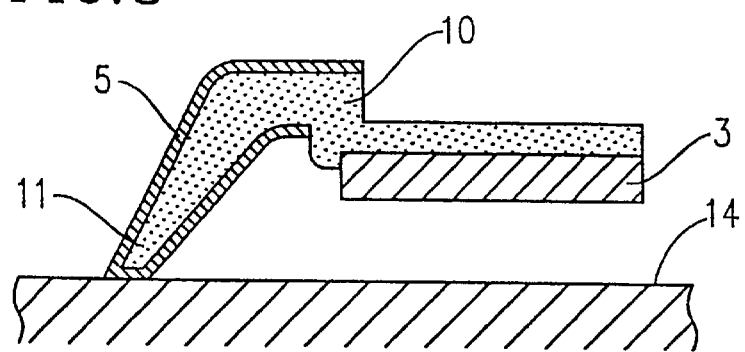
FIG. 3 is a cross-sectional view of a wiper according to still another embodiment of the present invention.

As shown in FIG. 1, the fabric material 5 may cover the wiper body 10, specifically, the lip portion 11 and a side surface of the wiper body 10. As shown in FIGS. 2 and 3, upper and lower surfaces of the lip portion 11 of the wiper body 10 and the side surface of the wiper body 10 may be covered with the fabric material 5.

Figure 10:
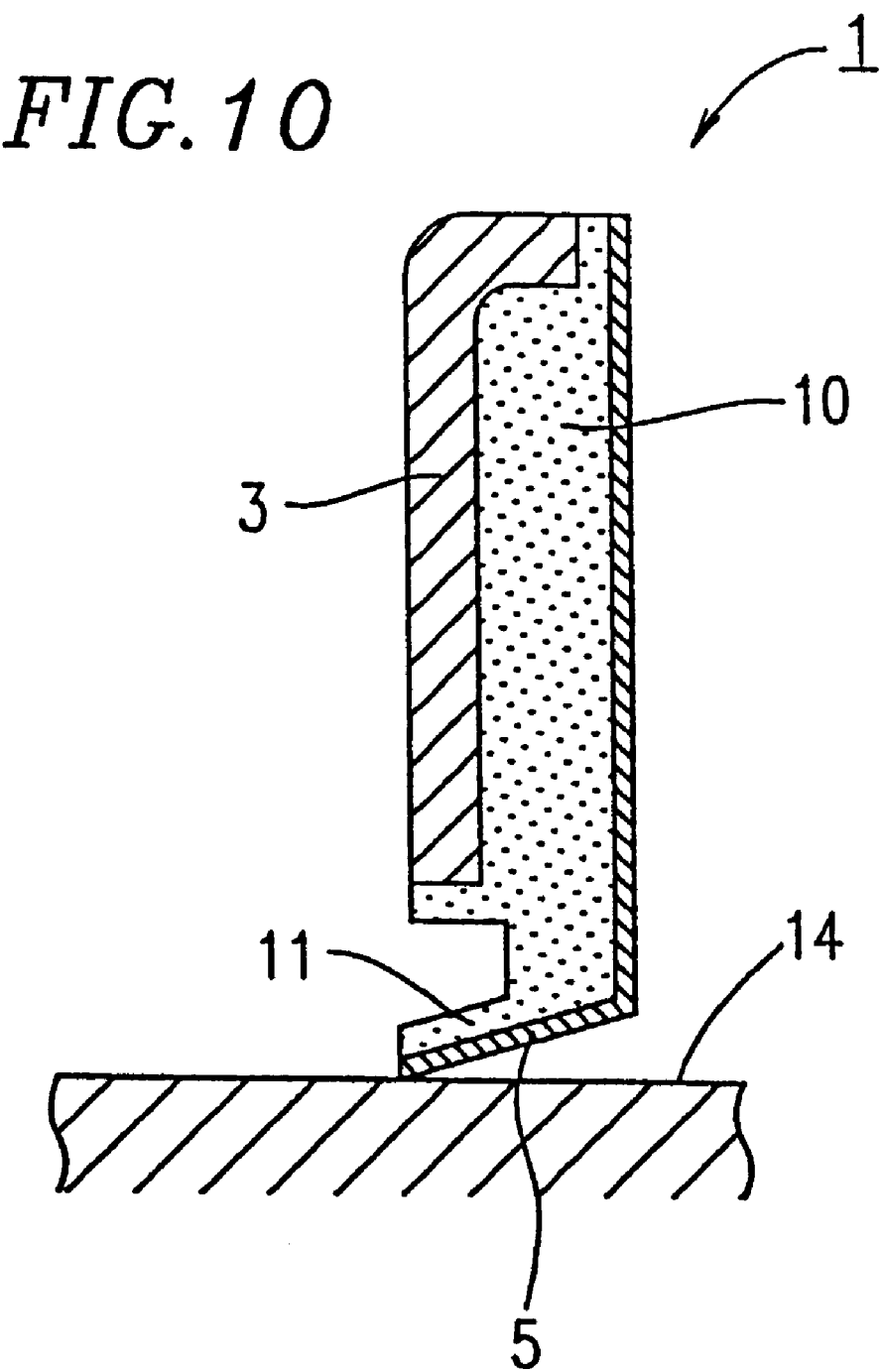
FIG. 10 is a cross-sectional view of a major portion of the wiper of FIG. 9.

Referring to FIG. 10, the fabric material 5 may be provided on the lower surface (sliding surface) of the lip portion 11.

When the lip portion 11 of the wiper body 10, which is made of an elastic material (e.g., rubber), is thus protected by the fabric material 5, the coefficient of friction of the lip portion 11 with respect to the sliding surface 14 is smaller than that of a conventional lip portion of rubber without a fabric material cover. Therefore, abrasion loss can be reduced, whereby closeness can be maintained for a long time. Although a conventional wiper including a sliding portion made of a metallic material has a low level of sliding resistance, the amount of chips leaked during an actual sliding operation is larger in the conventional wiper than in the wiper of the present invention. A wiper has a higher level of closeness when a sliding portion is made of elastic rubber. In this case, the sliding resistance is smaller than that of conventional sliding portions than when the sliding portion is made of a metallic material having a higher level of rigidity. Synthetic fibers used in weave fabric or the like have a small coefficient of friction (typically, 0.1 to 0.3). Synthetic fibers are also deformable and therefore do not hinder elastic deformation of the rubber. Therefore, the wiper 1 covered with the fabric material 5 made of synthetic fiber can be slid without losing closeness.

The outer surface of the lip portion 11 of the wiper body 10 is provided with the fabric material 5, so that the fabric material 5 makes contact with the sliding surface 14. Therefore, the frictional resistance of the wiper sliding portion is decreased, whereby abrasion can be reduced and the sliding surface 14 is prevented from being damaged.

Next, an exemplary method for producing the wiper of the present invention will be described.

The fabric material 5 (e.g., weave fabric made of a synthetic resin fiber) is provided on a predetermined portion of a mold. The mold is filled with unvulcanized rubber. The unvulcanized rubber is then vulcanized. The wiper body 10 is thus produced and at the same time the fabric material 5 is vulcanized to be adhered to the wiper body 10. In this case, a portion of the unvulcanized rubber is vulcanized while permeating the fabric material 5 or passing through stitches of the fabric material 5, whereby the wiper body 10 and the fabric material 5 are integrated together and therefore the adhesive strength therebetween is enhanced.

As shown in FIGS. 1 to 3, the present invention is applicable to wipers having various sizes and shapes for the purposes of removing chips and coolant produced during operations of machine tools and industrial machines.

EXAMPLES

Next, the present invention will be specifically described by way of illustrative examples.

Evaluation methods which are used in the following examples will be described below.

(1) Method for Measuring a Pressing Force of a Wiper

A. Testing Method

Figure 4:
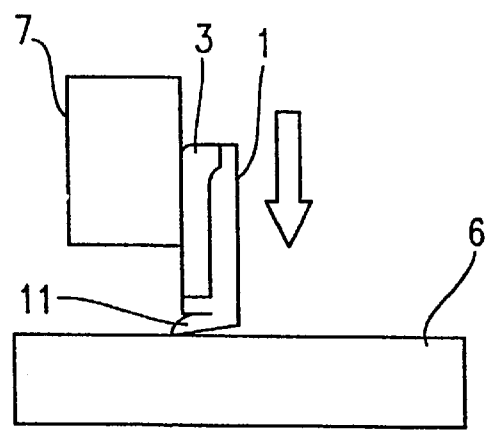
FIG. 4 is a diagram for explaining a method for measuring a pressing force of a wiper.

FIG. 4 shows a testing instrument. In FIG. 4, reference numeral 6 indicates a load cell, reference numeral 7 indicates a saddle, and reference numeral 1 indicates a wiper.

Figure 5:
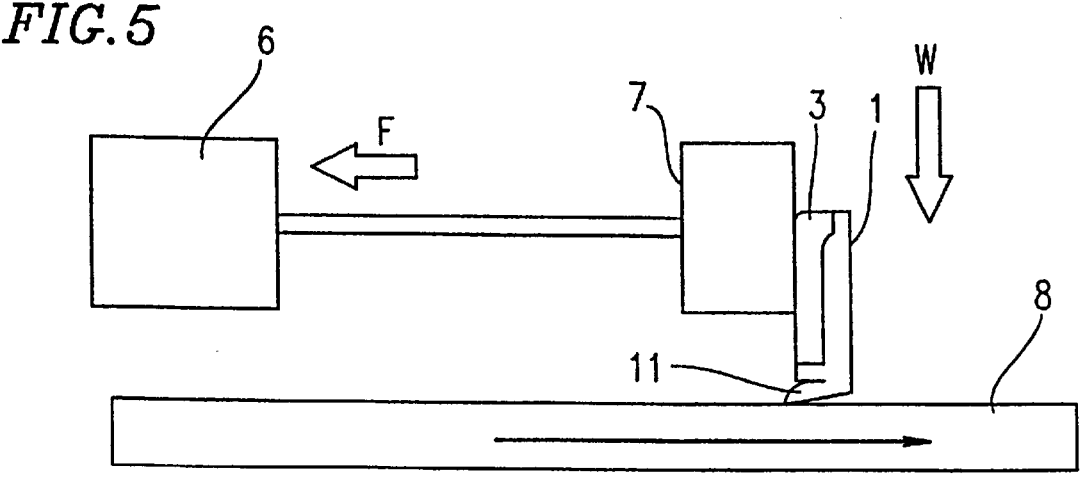
FIG. 5 is a diagram for explaining a method f or measuring a sliding resistance of a wiper.

The wiper 1 is fixed to the saddle 7. The wiper 1 is moved downward until a tip portion of the lip portion 11 of the wiper 1 touches a surface of the load cell 6. The wiper 1 is further moved by 0.5 mm to press the load cell 6. A force exerted on the load cell 6 is sensed by the load cell 6. Such a force is defined as a pressing force. The pressing force is typically represented in units of per centimeter. The pressing force is used as a vertical load (W) in the following section (manual resistance measurement).
B. Testing Conditions: No Lubricant (2) Method for Measuring a Sliding Resistance of a Wiper A. Testing Method FIG. 5 shows a testing instrument. In FIG. 5, reference numeral 6 indicates a load cell, reference numeral 7 indicates a saddle, reference numeral 1 indicates a wiper, and reference numeral 8 indicates a sliding bed.

While the wiper 1 is fixed to the saddle 7, the sliding bed 8 is moved in a direction indicated by an arrow. A force F exerted on the load cell 6 in a horizontal direction is sensed by the load cell 6. A coefficient of friction $\mu$ is calculated based on the force F and the vertical load W (a force generated when a wiper is pressed by a specified value of 0.5 mm) in accordance with an expression:

$$F=\mu W$$

where F represents a sliding resistance (Kgf), $\mu$ represents a coefficient of friction, and W represents a pressing force (Kgf).

Figure 6:
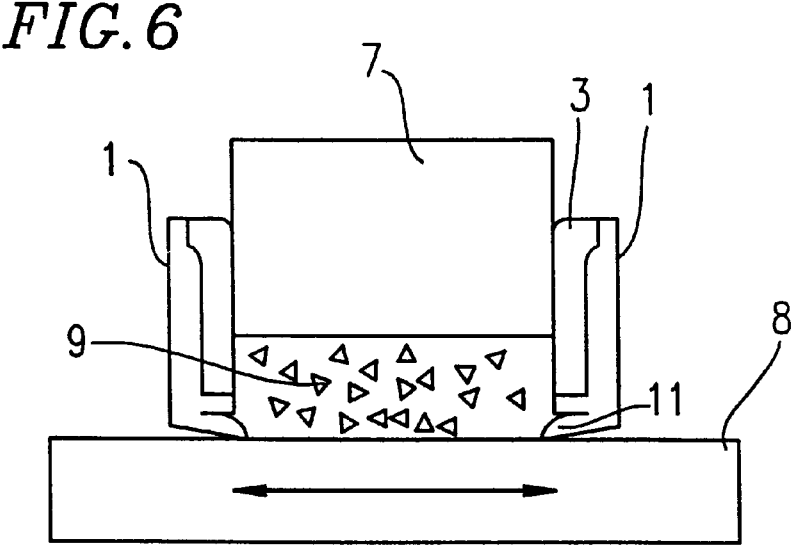
FIG. 6 is a diagram for explaining a method for testing a sliding operation of a wiper.

B. Testing Conditions:
No lubricant
Sliding rate of 10 m/min (3) Method for Testing a Sliding Operation of a Wiper A. Testing Method FIG. 6 shows a specimen and a testing instrument. In FIG. 6, reference numeral 7 indicates a saddle, reference numeral 1 indicates wipers, reference numeral 8 indicates a sliding bed, and reference numeral 3 indicates cored bars of the wipers 1.

The wipers 1 are fixed on the opposite sides of the saddle 7 as shown in FIG. 6. The sliding bed 8 is reciprocated while chips 9 are confined between the wipers 1. A distance traveled by a sliding portion 11 of the wiper 1 is calculated based on a sliding stroke of the sliding bed 8. The amount of chips which are leaked through the lip portions 11 of the wipers 1 and are present on the opposite ends of the sliding bed 8 is measured for different distances.

The wiper 1 used has the same cross-sectional shape as that of a standard product, and has a width of 120 mm. The wiper 1 is pressed by a specified value of 0.5 mm (such a value is 3 mm for a wiper including a sliding portion made of spring steel).

B. Testing Conditions:
No lubricant
Sliding rate of 25 m/min
Sliding stroke of 215 mm
Room temperature environment Comparative Example 1

Figure 7:
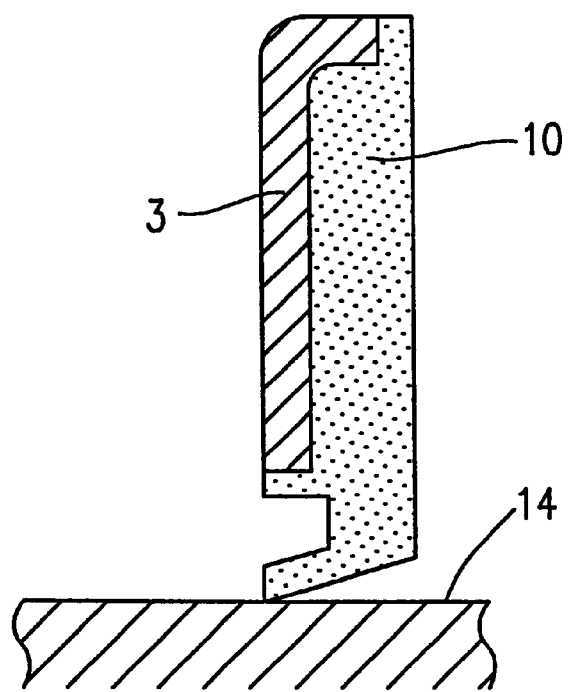
FIG. 7 is a cross-sectional view of a conventional wiper.

A cored bar was placed in a mold. The mold was filled with unvulcanized NBR followed by vulcanization. A wiper including a cored bar 3 and a wiper body 10 as shown in FIG. 7 was obtained.

This wiper was used, and the pressing force, sliding resistance and the amount of leaked chips were measured. The results are shown in Table 1.

Comparative Example 2

Figure 8:
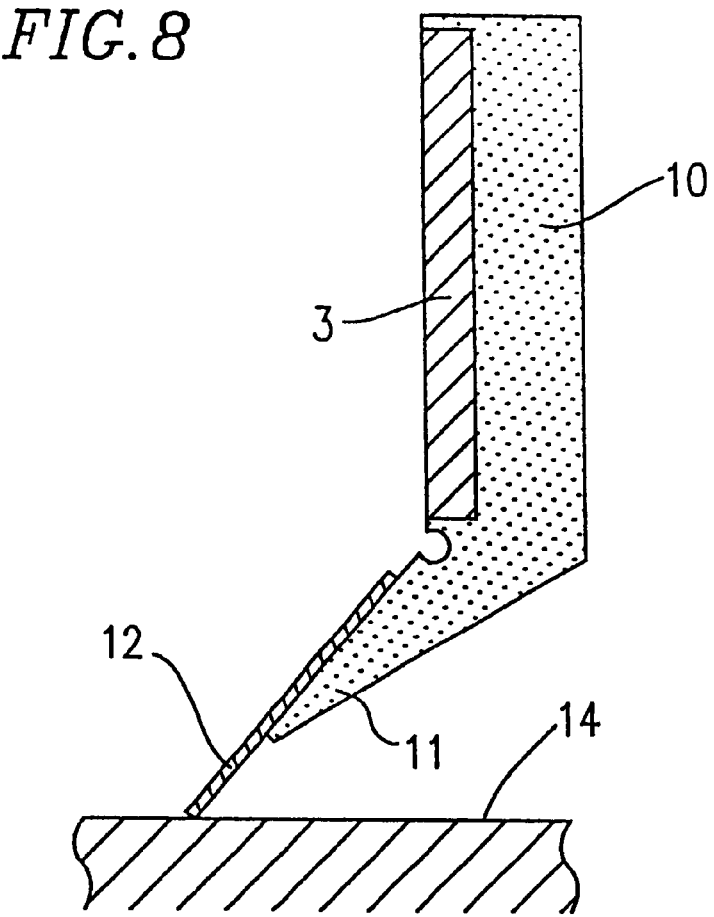
FIG. 8 is a cross-sectional view of another conventional wiper.

A wiper body 10 was made of NBR. A thin metal plate 12 was adhered to a lower surface of a lip portion 11 of the wiper body 10 by vulcanization, thereby obtaining a wiper 1 as shown in FIG. 8.

The wiper 1 was used, and the pressing force, sliding resistance and the amount of leaked chips were measured. The results are shown in Table 1.

Example 1

A cored bar and a weave fabric made of synthetic fibers were placed in a mold. The mold was filled with unvulcanized NBR followed by vulcanization. As a result, the wiper 1 including the cored bar 3 and the wiper body 10 as shown in FIG. 1 was obtained. A lip portion 11 of the wiper body 10 was covered with the weave fabric 5.

The wiper 1 was used, and the pressing force, sliding resistance and the amount of leaked chips were measured. The results are shown in Table 1.

TABLE 1

| Type of wiper Measured item | | Comparative Example 1 | Comparative Example 2 | Example 1 |
|---|---|---|---|---|
| Pressing force (gf/cm) | | 133 | 50 | 181 |
| Sliding resistance (gf/cm) | | 71 | 19 | 48 |
| Amount of leaked chips in sliding test (g) | 5 km of travel | 0.06 | 0.10 | 0.05 |
| | 15 km of travel | 0.12 | 0.16 | 0.09 |
| | 30 km of travel | 0.25 | 0.19 | 0.11 |

The results shown in Table 1 indicate the following.

In Comparative Example 1, the lip portion of the wiper made only of rubber had a high level of sliding resistance. The closeness of the wiper was lowered after long-term use, causing a large amount of leaked chips. In Comparative Example 2, the wiper including a sliding portion made of a metallic material had a low level of sliding resistance. The amount of leaked chips was small, but was larger than that of Example 1. Accordingly, when the sliding portion was made of elastic rubber, which has a sliding resistance smaller than that of Comparative Example 1 (conventional wiper), instead of a metallic material having a high level of rigidity, a higher level of closeness could be obtained.

In Example 1, rigid fibers, such as weave fabric, have small coefficients of friction. Rigid fibers are also deformable and therefore do not hinder elastic deformation of the rubber. Therefore, a wiper can be slid without losing closeness.

When as shown in Comparative Example 2, a sliding portion which is slid on a sliding surface is made of a metallic material, since a metallic material has a smaller level of abrasion loss than that of rubber, the abrasion life is excellent. However, a rubber having a high level of elasticity allows for a higher level of closeness than that of a metallic material having a high level of rigidity.

Example 2

A cored bar and a weave fabric made of synthetic fibers (nylon 6,6) were placed in a mold. The mold was filled with unvulcanized NBR followed by vulcanization. As a result, the wiper 1 including the cored bar 3 and the wiper body 10 as shown in FIG. 10 was obtained. A sliding surface of a lip portion 11 of the wiper body 10 was covered with the weave fabric 5.

The weave fabric used had a thickness of 0.5 mm (measured for the original fabric). The fineness of the wefts of the weave fabric was 100 deniers, while the fineness of the warps of the weave fabric was 50 deniers. The weave fabric was provided on a lower surface of the lip portion in such a manner that the wefts were provided orthogonal to a sliding direction.

This wiper was used, and the abrasion resistance thereof was measured under the following conditions.

A. Testing Method

The testing instrument of FIG. 6 was used. In FIG. 6, reference numeral 7 indicates a saddle, reference numeral 1 indicates wipers, reference numeral 8 indicates a sliding bed, and reference numeral 3 indicates the cored bars of the wipers 1.

The wipers 1 were fixed on the opposite sides of the saddle 7 as shown in FIG. 6. The sliding bed 8 was reciprocated while chips 9 were confined between the wipers 1. A distance traveled by the wiper 1 was calculated based on a sliding stroke of the sliding bed 8. The life of the wiper 1 was represented by the distance traveled by the wiper 1 until abnormal noise occurred.

The wiper 1 used had the same cross-sectional shape as that of a standard product, and had a width of 120 mm. The wiper 1 was pressed by a specified value of 0.5 mm.

B. Testing Conditions:

No lubricant

Sliding rate of 80 m/min

Sliding stroke of 215 mm

Room temperature environment

As a result, the distance traveled by the wiper 1 until abnormal noise occurred was 650 Km.

Example 3

A fabric material (original fabric to be used for a fabric layer) had a thickness of 1.0 mm, and the fineness of the wefts of the fabric material was 420 deniers, while the fineness of the warps of the fabric material was 210 deniers. In the other respects, a wiper of Example 3 was the same as that of Example 2. The abrasion resistance of the wiper of Example 3 was measured.

As a result, the distance traveled by the wiper until abnormal noise occurred was 2000 km.

Comparative Example 3

A fabric material was not used, and the wiper obtained in Comparative Example 1 was used. Except for this point, abrasion resistance was measured in a manner similar to that of Example 2.

As a result, the distance traveled by the wiper until abnormal noise occurred was 30 km.

INDUSTRIAL APPLICABILITY

A wiper for machine tools is provided in which a lip portion has a low level of abrasion resistance, and a low level of abrasion loss is small. A wiper for machine tools is provided in which no damages are caused due to collision or impact with chips and a sliding surface does not suffer from damages or the like.

What is claimed is:

1. A wiper for a machine tool comprising:

an attachment portion to be attached to a the machine tool, wherein the machine tool is moved relative to a sliding surface;

and a wiper body made of an elastic material integrated with the attachment portion, wherein a lip portion of the wiper body can be slid on the sliding surface, the lip portion of the wiper body is covered with a fabric material and a the fabric material is provided on at least a sliding surface side of the lip portion of the wiper body, wherein the fabric material is made of weave fabric, and wefts of the weave fabric being orthogonal to the sliding direction of the lip portion, the fineness of the wefts being in the range of 80 to 500 deniers the fineness of the warps being 40 deniers to 250 deniers, and the fineness of the warps being smaller than that of the wefts.

2. A wiper for a machine tool according to claim 1, wherein the fabric material is made of at least one material selected from the group consisting of aromatic polyamide, aliphatic polyamide, and polyester.

3. A wiper for a machine tool according to claim 1, wherein a thickness of the fabric material is 0.25 mm or more.

4. A wiper for a machine tool according to claim 1, wherein a coefficient of friction of a thread included in the fabric material is in the range of 0.1 to 0.3.

* * * * *